July 18, 1939.    O. B. ARNTZEN    2,166,779
LIQUID GAUGE
Original Filed Feb. 23, 1935

INVENTOR
Ole B. Arntzen
BY Edward E. James
ATTORNEY

Patented July 18, 1939

2,166,779

UNITED STATES PATENT OFFICE 2,166,779

LIQUID GAUGE

Ole B. Arntzen, Seattle, Wash., assignor to Arntzen, Incorporated, Seattle, Wash., a corporation of Washington Application February 23, 1935, Serial No. 7,765
Renewed June 14, 1939

9 Claims. (Cl. 33—126.4)

This invention relates to gauge structure and particularly is directed to a device for determining the liquid level in tanks of a character such as used for fuel oils, gasoline, and the like.

Stated generally, the object of the invention is to provide a perfected gauge adapted to be graduated according to a particular tank or tanks with which the same is to be employed and which, following such graduation, accurately indicates the liquid content of the tank.

It is a further and more particular object to provide, in conjunction with a liquid receiving tube, improved valve structure operated following the introduction of the tube within a tank for sealing the liquid within the tube in affording a true reading of the liquid level which obtains in the tank.

The foregoing, together with further objects and advantages of the invention, will become apparent in the course of the following detailed description and claims, the invention consisting in the novel construction, adaptation, and combination of parts hereinafter described and claimed.

Figure 2:
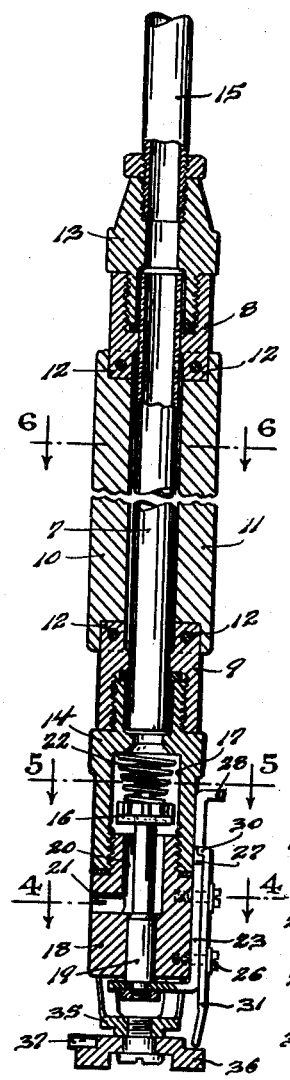
Fig. 2 is a diametrical vertical section, parts being shown in side elevation, to indicate the structural assembly of the now preferred embodiment of the invention.
Figure 3:
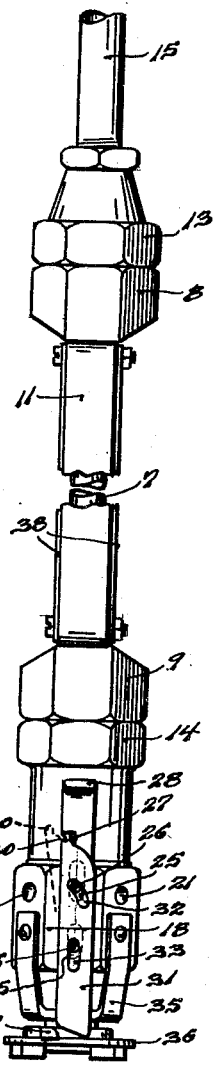
Figure 4:
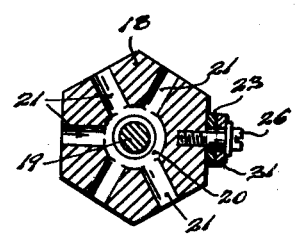
Figure 5:
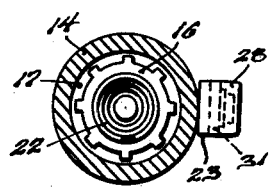
Figure 6:
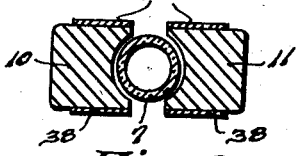

Fig. 3 is a side elevation thereof from a direction at right angles to that of Fig. 2; and Figs. 4, 5, and 6 are horizontal sections taken to an enlarged scale on the respective section lines 4—4, 5—5, and 6—6 of Fig. 2.

Figure 1:
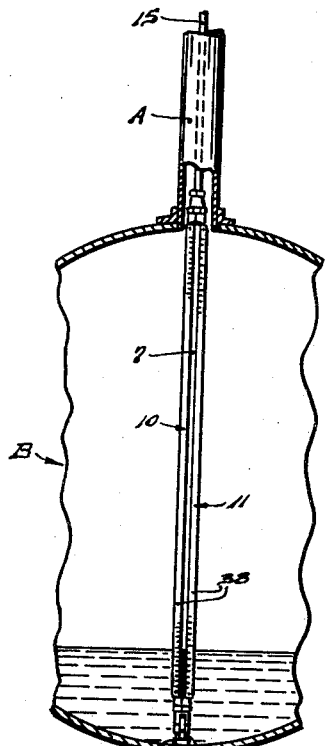
Figure 1 is a somewhat diagrammatic view indicating the application of the gauge in determining the liquid level within a tank.

With reference being had to the drawing, the invention provides a glass tube indicated by the numeral 7 which at its upper and lower ends is received in stuffing boxes 8 and 9, said stuffing boxes being connected by a pair of laterally spaced guards 10 and 11 vertically grooved in their adjacent faces to seat over the tube and fitting ears 12 formed on the inner ends of the boxes. Working against suitable packing, center-bored glands 13, 14 are received in the respective boxes, the gland 13 which lies at the upper end of the tube being threaded in its exterior opening for the reception of an extension 15 by means of which the tube (Fig. 1) is lowered from ground level through a lead pipe A to the tank B which contains the liquid to be gauged.

The gland 14, lying at the base of the tube, is formed at its lower end with a cylindrical bore 17 operating as a chamber for a spring-closing valve 16. A block 18 threaded in said chamber provides a seat for the valve and serves as a bearing for a valve control stem 19 extending axially through the block, said block being formed with an enlarged passage 20 at the upper end leading to the valve chamber from a plurality of radial ports 21. To increase the flow capacity through the valve chamber to the tube, the valve is formed with peripheral fingers and the spring 22 which is received over a stud extension of the valve between the valve and the head wall of the chamber is desirably conical.

More especially as respects the stem 19 of said valve, the exposed end of the same provides a shoulder against which the horizontal leg of an L-shaped setting arm 23 is clamped, the vertical leg of said arm being adapted to overlie the side of the block and having slots 25 therein engaging pins 26 threaded in the block, said vertical leg having a side notch 27 above the slots and at its upper terminus providing a finger extension 28 allowing manual elevation in setting the arm. Formed with a finger 30 adapted for engagement in said notch responsive to a setting of the arm, I provide a trip trigger 31, slots 32 and 33 in the same engaging over the pins 26 to provide a slide mounting, the upper slot being arcuate to ride the finger out of the side notch as the trigger is elevated.

To clarify the manner of using, the tube with the valve open is lowered into a tank whereby the liquid in the tank is admitted through ports 21, passage 20, and chamber 17 to the tube 7. In order, however, that the device may rest on the bottom of the tank without tripping the trigger to allow a time interval for the liquid in the tube to reach the level of the liquid which obtains in the tank, I provide a cage structure 35 which is introduced over the lower end of the block, a rotary foot 36 being swiveled in the base of the cage with the lower end of the trigger lying in the rotary path of travel of a pair of diametrically oppositely disposed lugs 37 formed on the foot. Friction toes desirably are provided on the underneath surface of the foot member. The arrangement operates through frictional engagement of the rotary foot with the floor of the tank, the operator turning the tube in a clockwise direction to elevate the trigger under the influence of one of the lugs 37 to trip the trigger whereby the setting arm 23 is released, the valve closing under the influence of the spring 22.

In using the gauge, a plurality of strips 38 graduated according to the capacity of the several tanks with which the gauge is employed, four strips being shown, are attached over the sides of the guards 10 and 11. To set the arm 23 prior to the lowering of the gauge into the tank whereby the valve is retracted from its seat with a compression of the spring 22, arm 23 is manually elevated and finger 30 is lodged in the notch 27. It is to be noted that the contact point of the trip trigger is located in offset disposition from the vertical plane of the pins 26 at the side opposite that of the finger 30, the underside being inclined to co-act with the arcuate upper slot 32 in obtaining movement of the finger 30 in a compound curve about the slot 33 as an axis responsive to the engagement of the cam-forming lug.

Modifications of the invention will readily suggest themselves and I accordingly intend that the appended claims be given the breadth in their construction which is commensurate with the scope of the invention within the art.

What I claim, is:

1. In a gauge for the purpose described, the combination with a pair of stuffing boxes and glands therefor, a glass tube having its opposite ends received in said stuffing boxes, laterally spaced apart guards overlying opposite sides of the tube and connecting the stuffing boxes, the lower of said glands being formed with a cylindrical bore operating as a valve chamber and communicating with the lower end of the tube, a block threaded into the outer end of said bore providing an admission port leading to the valve chamber, a spring-closing valve for said port providing a control stem extending axially through the block, means for elevating said stem to open the valve comprising a vertically movable setting arm overlying the side of the block and providing a horizontal leg extending under the block to engage the exposed end of the stem, means for locking the setting arm in its elevated valve-opening position, and rotary means movable through frictional contact with the floor of a liquid-containing tank with which the gauge is to be used for releasing said locking means to obtain a closing of the valve under the influence of the spring.

2. In a gauge for the purpose described, in combination with a pair of stuffing box assemblies, a glass tube having its opposite ends received in said stuffing box assemblies, the lower of said stuffing boxes being formed with a valve chamber having an admission port thereto, a spring-pressed valve for closing the port provided with a control stem extending exteriorly of the chamber, a notched vertically movable arm engaging the exposed end of said stem to open the valve in response to elevation of the arm, a trigger supported for a compounded vertical and pivotal action having means engaging the notch of the valve-opening arm to lock the latter in the elevated position of the same, and means for simultaneously elevating and pivoting said trigger for dislodging the notch-engaging means from the valve-opening arm to obtain a closing of the valve under the influence of the spring.

3. In a gauge for the purpose described, the combination with a pair of stuffing boxes, and a glass tube having its opposite ends received in the stuffing boxes, the lower of said stuffing boxes being formed with a valve chamber communicating with the interior of the tube, said valve chamber having an admission port, a spring-closing valve for said port provided with a control stem extending exteriorly of the chamber, a vertically movable arm engaging the exposed end of the control stem for opening the valve in response to elevation of the arm, a trigger provided with means for locking the arm in its elevated valve-opening position, and a rotary foot member operating in response to rotation of the foot relative to the tube for operating said trigger to dislodge the same from its arm-locking position.

4. In a gauge for measuring the liquid content of a tank, a glass tube, a chamber leading to the lower end of the tube provided with a valved opening, a spring operating to influence the valve for said opening into closed position, a vertically movable arm operating in opposition to the spring for opening the valve as the arm is elevated, a trigger for locking the arm in its elevated valve-opening position, and rotary means operating through frictional contact with the floor of the tank for dislodging the trigger from its arm-locking position.

5. In a gauge for measuring the liquid content of a tank, a glass tube, a chamber leading to the lower end of the tube provided with a valved opening, a spring operating to influence the valve for said opening into closed position, a vertically movable arm operating in opposition to the spring for opening the valve as the arm is elevated, a trigger for maintaining the arm in its elevated valve-opening position, and rotary means for releasing the trigger.

6. In a gauge for measuring the contents of a receptacle, a glass tube having an admission port to the lower end of the same, a valve for said port, a spring operating to influence the valve into port-closing position, means acting in opposition to the spring for opening the valve, means for locking said valve-opening means in its valve-opening position, and means operative following contact of the gauge with the floor of the receptacle for releasing the locking means automatically in response to revoluble movement of the gauge relative to the receptacle.

7. In a gauge for measuring the contents of a receptacle, a glass tube having an admission port to the lower end of the same, a valve for said port, a spring operating to influence the valve into port-closing position, means acting in opposition to the spring for opening the valve, means for retaining said valve-opening means in its valve-opening position, and means mounted for rotary movement relative to the tube and operating in response to relative movement between the same for rendering said retention means inoperative to the valve-opening means.

8. In trip mechanism for closing a valve, in combination with the valve, a setting arm having operative engagement with the valve and provided with rectilineal slots, pins for said slots operating to guide the arm for movement in a rectilineal plane, and a trigger provided with a rectilineal slot at one end of the same and having a curvilinear slot at the opposite end, said slots fitting over the pins, the trigger at one end of the same and laterally offset from the plane of the pins having a finger adapted to engage the arm in one extreme of the longitudinal movement of the trigger, the trigger at its opposite end and laterally offset from the plane of the pins at the side opposite from that of the finger providing an operating tip, movement of said tip in a direction longitudinally of the setting arm operating to swing the finger in a compound arc about the rectilineal slot of the trigger as an axis to dislodge the trigger from the arm.

9. A gauge comprised of the combination of a tube adapted to be lowered into a liquid-containing tank for measuring the level of the liquid in the tank, the tube having a liquid-admission opening disposed to lie below the level of the liquid in the tank and at its lower end being fitted with a foot member arranged for rotary movement relative to the tube, said rotary movement being obtained through frictional contact as between the foot member and the floor of the tank, a self-closing valve for said liquid-admission opening, means holding said valve in open, liquid-admitting position, and trip mechanism operated by said rotary movement by which said means is released to permit a closing operation of the valve for trapping liquid from the tank within the tube.

OLE B. ARNTZEN.